United States Patent
Otts et al.

(10) Patent No.: US 9,244,203 B2
(45) Date of Patent: Jan. 26, 2016

(54) LIQUID MENISCUS LENS WITH IMPROVED SALINE FORMULATION

(75) Inventors: Daniel B. Otts, Fruit Cove, FL (US); Katherine Hardy, Jacksonville, FL (US); Sharika Snook, St. Augustine, FL (US); Adam Toner, Jacksonville, FL (US); James Daniel Riall, St. Johns, FL (US); Randall B. Pugh, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 60 days.

(21) Appl. No.: 13/599,624

(22) Filed: Aug. 30, 2012

(65) Prior Publication Data

US 2013/0229618 A1 Sep. 5, 2013

Related U.S. Application Data

(60) Provisional application No. 61/529,343, filed on Aug. 31, 2011.

(51) Int. Cl.
| | | |
|---|---|---|
| *G02C 3/00* | (2006.01) | |
| *G02C 7/00* | (2006.01) | |
| *G02C 7/02* | (2006.01) | |
| *G02B 3/12* | (2006.01) | |
| *G02B 3/14* | (2006.01) | |
| *G02B 26/00* | (2006.01) | |
| *G02C 7/08* | (2006.01) | |

(52) U.S. Cl.
CPC .. *G02B 3/12* (2013.01); *G02B 3/14* (2013.01); *G02B 26/005* (2013.01); *G02C 7/022* (2013.01); *G02C 7/085* (2013.01)

(58) Field of Classification Search
CPC ........ G02B 3/14; G02B 26/005; G02B 7/028; G02B 7/36; G02C 7/101
USPC .......... 359/665, 666, 653, 710, 832; 351/159.68, 159.03, 159.04, 159.34, 351/159.39; 252/500; 514/214.02
See application file for complete search history.

(56) References Cited

U.S. PATENT DOCUMENTS

| | | | |
|---|---|---|---|
| 7,724,444 B2 * | 5/2010 | Kuiper et al. ................ 359/666 |
| 2006/0151754 A1 * | 7/2006 | Choi et al. .................... 252/500 |
| 2006/0152672 A1 * | 7/2006 | Hendriks et al. ............. 351/159 |
| 2007/0153405 A1 * | 7/2007 | Kuiper et al. ................ 359/846 |
| 2007/0247724 A1 | 10/2007 | Jung | |
| 2008/0137213 A1 | 6/2008 | Kuiper et al. | |
| 2010/0020285 A1 | 1/2010 | Berge | |
| 2011/0201596 A1 * | 8/2011 | Alli et al. ................ 514/214.02 |

FOREIGN PATENT DOCUMENTS

| | | | |
|---|---|---|---|
| WO | WO 2004099846 A1 | 11/2004 |
| WO | WO 2009036272 A1 | 3/2009 |
| WO | WO 2011075720 A1 | 6/2011 |

OTHER PUBLICATIONS

International Search Report for PCT US2012053055 date of mailing Nov. 26, 3023.
Search Report for Taiwan Patent Application No. 101131893 Date of Report Jul. 20, 2015; Date Johnson & Johnson Notified of Search Report: Aug. 11, 2015.

* cited by examiner

*Primary Examiner* — Scott J Sugarman
*Assistant Examiner* — Mustak Choudhury

(57) ABSTRACT

The present invention relates generally to a high-efficiency Electrowetting saline solution formulation. Specific embodiments include high-efficiency Electrowetting saline formulations that maximize the electrical performance of an arcuate liquid meniscus lens incorporated in an ophthalmic lens and operated using direct current.

29 Claims, 9 Drawing Sheets

LIQUID MENISCUS LENS WITH IMPROVED SALINE FORMULATION

CROSS REFERENCE TO RELATED APPLICATIONS

This application claims priority to Provisional U.S. Patent Application Ser. No. 61/529,343, filed on Aug. 31, 2011.

FIELD OF USE

The present invention relates to Electrowetting saline formulations. More specifically, the present invention provides a liquid meniscus lens with improved saline liquid properties.

BACKGROUND

Liquid meniscus lenses have been known in various industries. As discussed more fully below with reference to FIGS. 1A and 1B, known liquid meniscus lenses were engineered in cylindrical shapes with a perimeter surface formed by points at a fixed distance from an axis which is a straight line. Known examples of the use of liquid meniscus lenses include devices such as electronic cameras.

Generally, liquid meniscus lenses have been limited to designs that use an alternating current (AC) power source to control changes to the lens. AC minimizes or eliminates charge trapping within the dielectric insulating layer of the device which leads to a more predictable performance of the liquid meniscus lens and ultimately a longer device lifetime. Consequently, saline formulations have been used in AC driven lenses with small ions. The alternating current has minimized the likelihood that small ions used within the device will become embedded in the dielectric layer and thereby reduce device performance.

Heretofore, examples of liquid meniscus lenses have incorporated saline solutions containing low molecular weight inorganic salts such as potassium chloride, sodium sulfate, potassium acetate, and lithium chloride.

Traditionally, ophthalmic lens, such as a contact lenses and an intraocular lenses have been biocompatible devices with a corrective, cosmetic or therapeutic function. A contact lens, for example, may provide one or more of: vision correcting functionality; cosmetic enhancement; and therapeutic effects. Each function may be provided by one or more physical characteristics of the lens. For example, a design incorporating a refractive quality into a lens may provide a vision corrective function, a pigment incorporated into the lens may provide cosmetic enhancement, and an active agent incorporated into a lens may provide therapeutic functionality.

SUMMARY

Accordingly, the present invention provides a high-efficiency Electrowetting saline solution formulated to significantly improve the electrical performance of a liquid meniscus lens operated using either direct current or alternating current. When a magnitude of voltage is applied to an arcuate liquid meniscus lens, an electrostatic charge may built up at the dielectric-conductive material interface as well as the dielectric-saline solution interface. Charge trapping occurs due to small ions, as found in a standard saline solution, being attracted to and adsorbed onto or absorbed into the dielectric material thereby diminishing the ability of the dielectric to maintain a surface electrostatic charge. Additionally, as a result the liquid meniscus may move some distance along the Meniscus Wall when voltage is first applied to the lens. However, the liquid meniscus may later relax moving back in the direction of the non-energized state causing the lens to lose its desired optical power.

A high-efficiency Electrowetting saline solution may be used to avoid charge trapping. When utilized in an Electrowetting device, the high-efficiency Electrowetting saline solution of the present invention contains zwitterionic organic compounds that do not readily move toward the dielectric-saline solution interface along with a lesser amount of sterically-Bulky organic salts which do not easily embed themselves into the dielectric material. The saline solution may further include a design to minimize or eliminate the presence or formation of other small molecules and ions within the solution by incorporating a limited number of components having known high purity and by maintaining the saline at near-neutral pH. With charge trapping virtually eliminated, as direct current (DC) voltage is applied to a liquid meniscus lens, the liquid meniscus may move to a desired location along the Meniscus Wall and maintain both its position and corresponding optical power. By virtue of the present invention, ultra-low power consumption may be achieved using integrated circuits designed to drive liquid meniscus lenses that may take advantage of the electrical performance of high-efficiency Electrowetting saline solutions.

DETAILED DESCRIPTION OF THE INVENTION

Figure 1A:
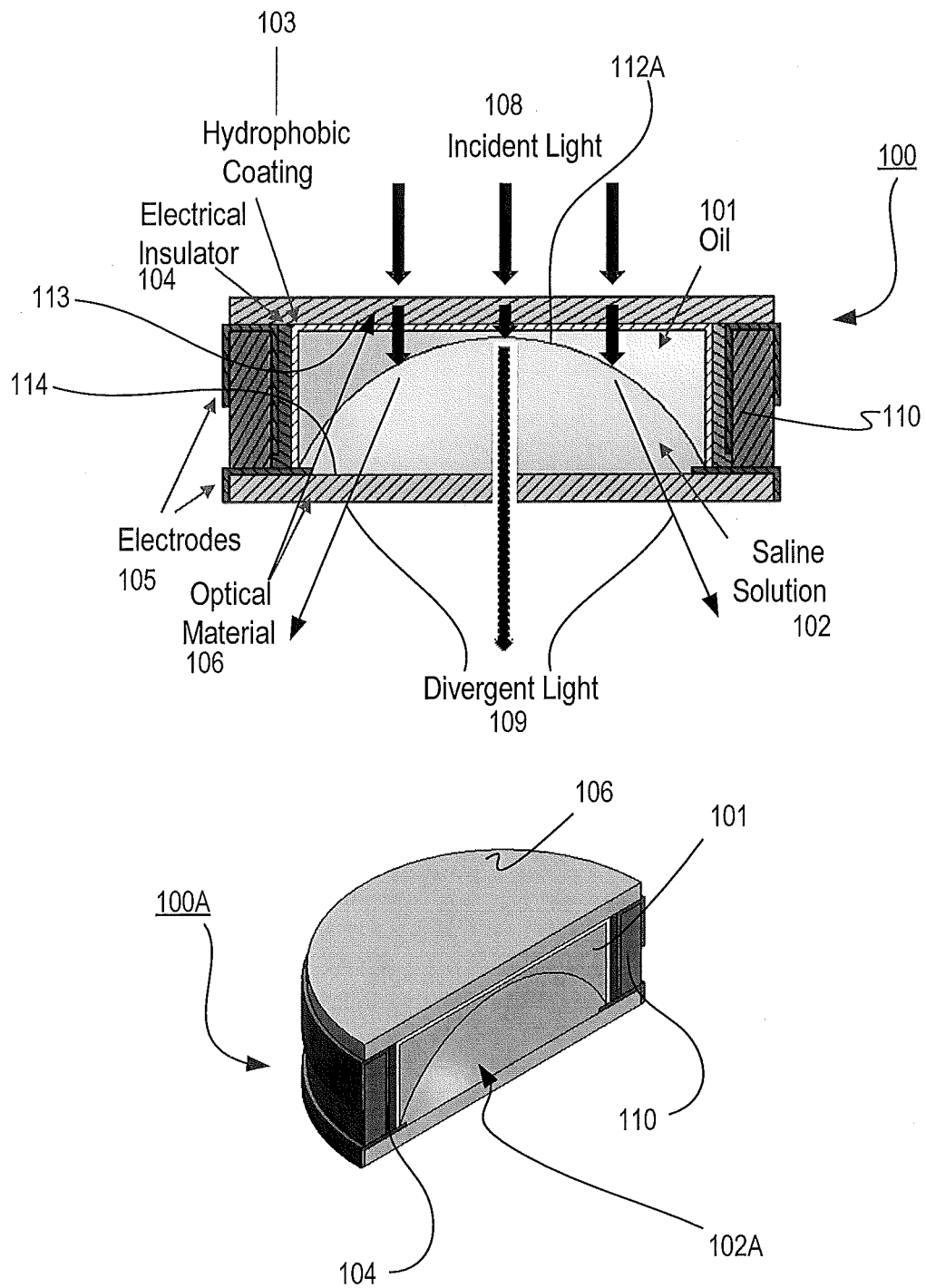
FIG. 1A illustrates a prior art example of a cylindrical liquid meniscus lens in a first state.

The present invention provides for a high-efficiency Electrowetting saline solution formulation with properties conducive to avoid charge trapping within a dielectric layer of an Electrowetting device, for example, in a liquid meniscus lens.

GLOSSARY

In this description and claims directed to the presented invention, various terms may be used for which the following definitions will apply:

Alternating Current (AC): an electric current that reverses direction in a circuit at regular intervals; an electric current that repeatedly changes its direction or strength, usually at a certain frequency or range of frequencies.

Bulky Molecule: a used herein means a molecule having at least one branched or tertiary moiety (as in the example of the tertiary nitrogen of Triethanolamine) and/or at least one cyclic moiety (e.g. Cyclohexylamine).

Contact Angle: may also be referred to as the Liquid Meniscus Boundary and is the angle at which the oil/saline solution interface meets the Meniscus Wall. In the case of a linear Meniscus Wall, the contact angle is measured as the angle between the Meniscus Wall and the line tangent to the Liquid Meniscus Boundary at the point where the Liquid Meniscus Boundary meets the Meniscus Wall. In the case of a curved Meniscus Wall, the contact angle is measured as the angle between the lines tangent to the Meniscus Wall and the Liquid Meniscus Boundary at the point where they meet.

Direct Current (DC): an electric current flowing in one direction only; an electric current that moves in one direction with constant strength.

Electrowetting Device: device that uses an externally applied electric field to actuate or manipulate small volumes of liquid by altering the interfacial tension of the saline-Meniscus Wall interface and hence the macroscopic contact angle or by inducing bulk liquid motion through an interfacial electric stress.

Electrowetting Saline: a solution containing dissolved ions that may be suitable for an Electrowetting Device.

Liquid Meniscus Boundary: the arcuate or flat fluid interface between a saline solution and an oil in an Electrowetting Device. Generally, the interface may form a lens that is concave on one side and convex on the other.

Meniscus Cavity: the space in a liquid meniscus lens between the front curve lens and the back curve lens in which oil and saline solution are maintained.

Meniscus Wall: a specific area on the interior of one or both of the front curve lens and the back curve lens, such that it is within the Meniscus Cavity, along which the Liquid Meniscus Boundary moves.

Optical Zone: as used herein refers to an area of a lens through which a user of a lens sees. For example, the area in an ophthalmic lens though which a wearer of the ophthalmic lens may see.

Sharp: a geometric feature of an internal surface of either a front curve or back curve lens piece suitable to help contain the location of a contact line of two predefined fluids on the optic. In most embodiments, the Sharp is an outside corner rather than an inside corner. From a fluid standpoint may be an angle greater than 180 degrees.

Zwitterion: as used herein means a neutral molecule with a positive and a negative electrical charge at different locations within that molecule. Zwitterions may sometimes also be referred to herein as "inner salts".

As described further below, a contact lens may include an arcuate liquid meniscus lens with a Meniscus Wall and physical features conducive to one or both of attraction and repulsion of a liquid contained within the lens and forming a meniscus boundary with another liquid. Such lenses include a first optic proximate to a second optic with a cavity formed therebetween. A saline solution and an oil are maintained within the cavity. Application of an electrical charge to a Meniscus Wall generally located in a perimeter area of one or both of the first optic and the second optic changes the physical shape of a meniscus formed between the saline solution and oil maintained within the cavity.

Physical constraints including a size and shape of a liquid meniscus lens may preclude the use of batteries or other power supplies capable of operating the lens using alternating current, which is much more power consumptive than direct current for a variety of reasons. To optimize power management along with utilization of available volume, direct current may be employed to efficiently operate a liquid meniscus lens. However, use of direct current increases the potential for charge trapping and related performance degradation. Consequently, traditional saline solutions used in Electrowetting applications are not favorable for such applications.

Referring now to FIG. 1A, a cut section of a prior art lens 100 is illustrated with an oil 101 and a saline solution 102 contained within cylinder 110. The cylinder 110 includes two plates of optical material 106. Each plate 106 includes a flat interior surface 113-114. The cylinder 110 includes an interior surface that is essentially rotationally symmetric. In some prior art embodiments, one or more surfaces may include a hydrophobic coating. Electrodes 105 are also included on or about the perimeter of the cylinder. An electrical insulator 104 may also be used proximate to the electrodes 105.

According to the prior art, each of the interior surfaces 113-114 is essentially flat or planar. An interface surface 112A is defined between the saline solution 102A and the oil 101. As illustrated in FIG. 1A, the shape of the interface 112A is combined with the refractive index properties of the saline solution 102A and the oil 101 to receive incident light 108 through a first interior surface 113 and provide divergent light 109 through a second interior surface 114. The shape of the interface surface between the oil 101 and the saline solution 102 may be altered with the application of an alternating electrical current to the electrodes 105.

At 100A, a perspective view of the prior art lens illustrated at 100 is depicted.

Figure 1B:
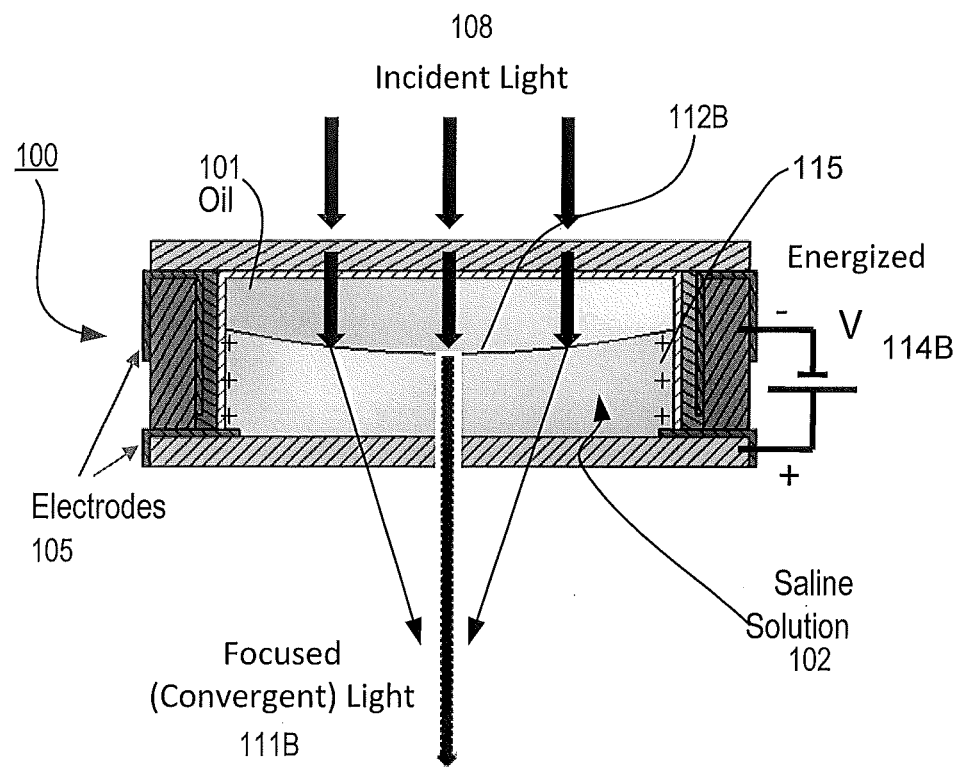
FIG. 1B illustrates the prior art example of a cylindrical liquid meniscus lens in a second state.
Figure 1B:
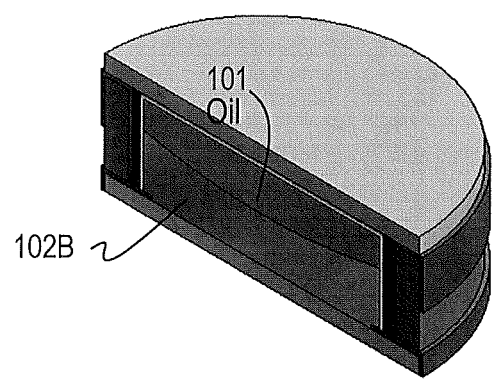

Referring now to FIG. 1B, the prior art lens 100 is illustrated in an energized state. The energized state is accomplished by applying voltage 114B across the electrodes 105. The shape of the interface surface 112B between the oil 101 and the saline solution 102 is altered with the application of an electrical current to the electrodes 105. As illustrated in FIG. 1B, incident light 108 passing through the oil 101 and the saline solution 102 is focused into a convergent light pattern 111B.

Figure 2:
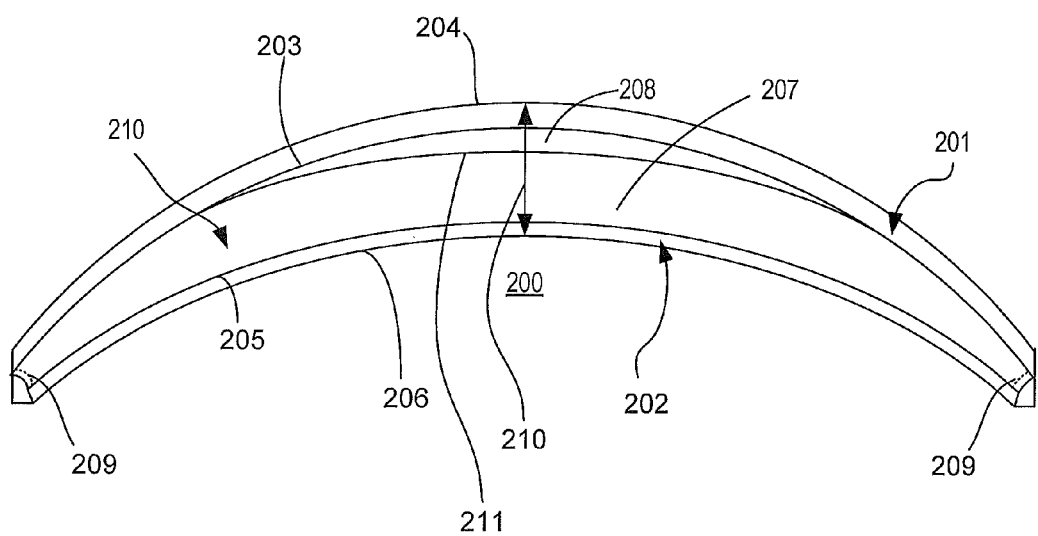
FIG. 2 illustrates a profile sliced cut section of an exemplary liquid meniscus lens according to some embodiments of the present invention.

Referring now to FIG. 2, a cut section of an exemplary novel arcuate liquid meniscus lens 200 with a front curve lens 201 and a back curve lens 202 is depicted. The front curve lens 201 and the back curve lens 202 which are positioned proximate to each other and form a cavity 210 therebetween. The front curve lens may include a concave arcuate interior lens surface 203 and a convex arcuate exterior lens surface 204. The concave arcuate lens surface 203 may have one or more coatings (not illustrated in FIG. 2). Coatings may include, for example, one or more of electrically conductive materials or electrically insulating materials, hydrophobic materials or hydrophilic materials. One or both of the concave arcuate lens surface 203 and the coatings may be in liquid and/or optical communication mainly with an oil 208 contained within the cavity 210.

The back curve lens 202 may include a convex arcuate interior lens surface 205 and a concave arcuate exterior lens surface 206. The convex arcuate lens surface 205 may have one or more coatings (not illustrated in FIG. 2). Coatings may include, for example, one or more of electrically conductive materials or electrically insulating materials, hydrophobic materials or hydrophilic materials. At least one of the convex arcuate lens surface 205 and the coatings may be in liquid and optical communication mainly with a saline solution 207 contained within the cavity 210. The saline solution 207 includes one or more salts or other components which are electrically conductive and as such may be either attracted to or repulsed by an electric charge.

According to the present invention, an electrically conductive coating 209 may be located along at least a portion of a periphery of one or both of the front curve lens 201 and the back curve lens 202. The electrically conductive coating 209 may include, for example, gold or silver and should preferably be biocompatible. Application of an electrical charge to the electrically conductive coating 209 may create either an attraction or a repulsion of the electrically conductive salts or other components in the saline solution.

In an aspect of the present invention, the arcuate liquid meniscus lens may be an optical assembly of refractive elements. The front curve lens 201 which may have an optical power in relation to light passing through the concave arcuate interior lens surface 203 and a convex arcuate exterior lens surface 204. The optical power may be 0 or may be a plus or minus power. In some preferred embodiments, the optical power may be a power typically found in corrective contact lenses, such as, by way of non-limiting example, a power between −8.0 and +8.0 diopters. Furthermore, the back curve lens 202 may have an optical power in relation to light passing through the convex arcuate interior lens surface 205 and a concave arcuate exterior lens surface 206. The optical power may be 0 or may be a plus or minus power. In some embodiments, the optical power is a power typically found in corrective contact lenses, such as, by way of non-limiting example, a power between −8.0 and +8.0 diopters.

Various embodiments may also include a change in optical power associated with a change in shape of a liquid meniscus 211 formed between the saline solution 207 and the oil 208. In some embodiments, a change in optical power may be relatively small, such as, for example, a change of between 0 to 2.0 diopters of change. In other embodiments, a change in optical power associated with a change in shape of a liquid meniscus 211 may be up to about 30 or more diopters of change. Generally, a higher dynamic range of optical power associated with a change in shape of a liquid meniscus 211 generally is associated with a lens having a greater thickness 210.

According to some embodiments of the present invention, such as those embodiments that may be included in an ophthalmic lens, such as a contact lens, a cross cut lens thickness 210 of an arcuate liquid meniscus lens 200 may be up to about 1,000 microns thick. An exemplary lens thickness 210 of a relatively thinner lens 200 may be up to about 200 microns thick. Preferred embodiments may include a liquid meniscus lens 200 with a lens thickness 210 of about 600 microns thick. Generally a cross cut thickness of front curve lens 201 may be between about 35 microns to about 200 microns and a cross cut thickness of a back curve lens 202 may also be between about 35 microns and 200 microns.

According to the present invention, an aggregate optical power is an aggregate of optical powers of the front curve lens 201 the back curve lens 202 and a liquid meniscus 211 formed between the oil 208 and the saline solution 207. In some embodiments, an optical power of the lens 200 may also include a difference in refractive index as between one or more of the front curve lens 201, the back curve lens 202, oil 208 and the saline solution 207.

In those embodiments that include an arcuate liquid meniscus lens 200 incorporated into a contact lens, it may be additionally desirous for the saline 207 and oil 208 to remain stable in their relative positions within the curved liquid meniscus lens 200 as a contact wearer moves. Generally, it is preferred to prevent the oil 208 from significantly moving relative to the saline 207 when the wearer moves. Accordingly, an oil 208 and saline solution 207 combination may be preferably selected with a same or similar density. Additionally, an oil 208 and a saline solution 207 preferably have relatively low miscibility so that the saline 207 and oil 208 will not significantly mix.

In some preferred embodiments, a volume of saline solution 207 contained within the cavity should be greater than the volume of oil 208 contained within the cavity. Additionally, some preferred embodiments may include the saline solution 207 in contact with a significant portion of an interior surface 205 of the back curve lens 200, or in some embodiments an entirety of the interior surface 205. Some embodiments may include a volume of oil 208 that is about 66% or more by volume as compared to an amount of saline solution 207. Other embodiments may include an arcuate liquid meniscus lens wherein a volume of the oil 208 is about 90% or less by volume as compared to an amount of the saline solution 207.

Figure 3:
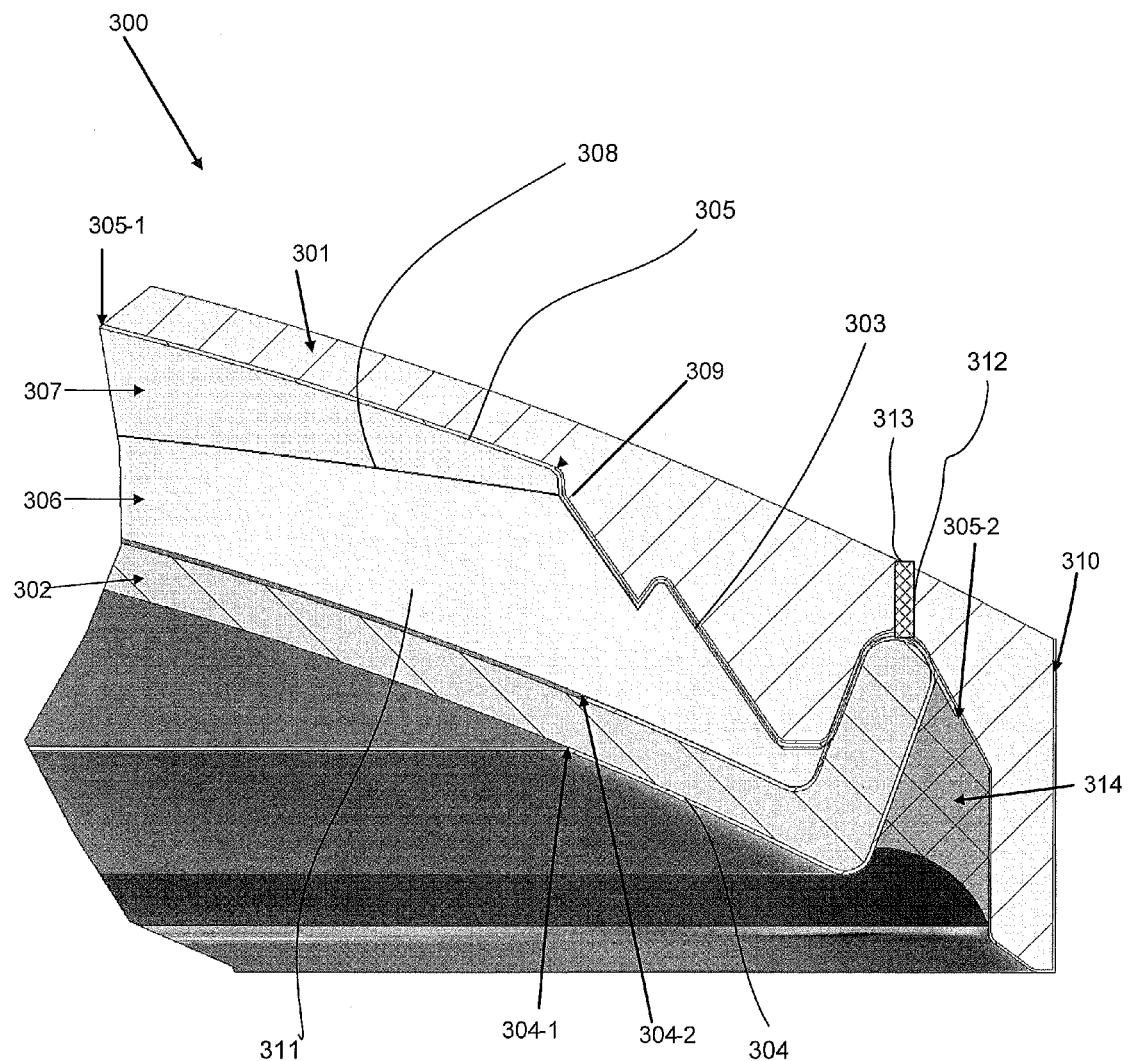
FIG. 3 illustrates a cut section of an exemplary arcuate liquid meniscus lens, according to some embodiments of the present invention.

Referring now to FIG. 3, a cut section of an arcuate liquid meniscus lens 300 is illustrated. As discussed above, an arcuate liquid meniscus lens 300 may include combined front curve lens 301 and back curve lens 302 components. The front curve lens 301 and back curve lens 302 may be formed with one or more materials that are at least partially transparent. In some embodiments, one or both of the front curve lens 301 and the back curve lens 302 include generally optically clear plastic, such as for example, one or more of: PMMA, cyclo olefin copolymers, and TPX.

One or both of the front curve lens 301 and the back curve lens 302 may be fashioned, for example, via processes such as one or more of: single point diamond turning lathing; injection molding; digital mirror device free forming.

One or both of the front curve lens 301 and the back curve lens 302 may additionally include a coating, for example, a conductive coating 303 extending along a perimeter portion from 309 to 310, as illustrated. In some preferred embodiments, a conductive coating 303 includes gold. The gold may be applied via a sputter process, vapor deposition or other suitable known in the art process. Alternative conductive coatings 303 may include, by way of non-limiting example, aluminum, nickel, and indium tin oxide. Generally, the conductive coating 303 should be applied to perimeter areas of one or both of the front curve lens 301 and the back curve lens 302.

In some embodiments, of the present invention, a back curve lens 302 may have a conductive coating 304 applied to specific areas. For example, portions about the perimeter of the back curve lens 302 may be coated from a first boundary 304-1 to a second boundary 304-2. Again, the gold coatings may be applied by any of the previously given examples. Additionally, in some of these embodiments a mask may be used to apply the gold or other conductive material in a predetermined pattern around one or more perimeter portions of a front curve lens 301 or a back curve lens 302. Alternative conductive materials may also be applied using various methods and covering varying areas of the back curve lens 302. Furthermore, in another aspect of some embodiments of the present invention, a conductive pass through may be used to provide electrical communication to a conductive coating on an interior surface of one or both of the front curve lens 301 and the back curve lens 302. For example one or more holes or slots in a back curve lens 302 may be filled with a conductive filler material, such as, for example, a conductive epoxy.

In another aspect of the present invention, one or both of the front curve lens 301 and the back curve lens 302 may be created from multiple different materials wherein an Optical Zone may be in a central area of the front curve lens 301 and the back curve lens 302 (not illustrated), and may include an optically transmissive material and a peripheral zone may include an optically opaque area that includes an electrically conductive material. The optically opaque area may also include one or more of control circuitry and/or energy sources.

In still another aspect, in some embodiments, an insulator coating 305 may also be applied to a front curve lens 301. By way of non-limiting example, the insulator coating 305 may be applied in an area from a first region 305-1 and extend to a second region 305-2. Insulators may include, for example, Parylene C, Teflon AF or other materials with various electrical and mechanical characteristics and electrical resistance.

In some embodiments, said insulator coating 305 may create a boundary area to maintain separation between the conductive coating 303 and a saline solution 306 contained in a cavity between the front curve lens 301 and the back curve lens 302. Some embodiments accordingly may include an insulator coating 305 patterned and positioned in one or more areas of one or both of the front curve lens 301 and the back curve lens 302 to prevent a positively charged conductor 303 and negatively charged saline solution 306 from coming into contact, wherein contact of a conductor 303 and a saline solution 306 may result in an electrical short. Embodiments may include a positively charged saline solution 306 and a negatively charged conductor 303, or vice versa.

Still other embodiments may allow for a short between a conductor 303 and a saline solution 306 to function as a reset function of circuitry associated with the operation of the lens 300. For example, a short condition may interrupt power source to the lens and cause the saline solution 306 and the oil 307 to revert to a default position.

Some preferred embodiments may include a conductor 303 that extends from an area 309 on the interior of the cavity 311 to an area 310 external to the cavity 311. Other embodiments may include a channel 312 through the front curve lens or the back curve lens which may be filled with a conductive material 313, such as, for example, a waterproof conductive epoxy. The conductive material 313 may form or be connected to an electrical terminal external to the cavity. An electrical charge may be applied to the terminal and conducted to the coating via the conductive material 313 in the channel 312.

The thickness of the insulator coating 305 may be varied as a parameter of lens performance. According to the present invention, charged components, including the saline solution 306 and the conductor 303, may be maintained on both sides of the insulator coating 305. The present invention may provide for an indirect relationship between the thickness of the insulator coating 305 and an electric field strength between the saline solution 306 and the conductor 303, wherein the farther apart the saline solution 306 and the conductor 303 are maintained, the weaker the electric field strength will be for a given applied voltage.

Generally, the present invention provides that electrical field strength may be attenuated dramatically as insulator coating 305 thickness increases. The closer together the saline solution 306 and conductor 303 are, the greater the electrostatic forces available to move a spherical Liquid Meniscus Boundary 308 may be with a given applied voltage. Likewise, as the distance between the saline solution 306 and conductor 303 increases, the weaker the electrostatic forces available may be to move a spherical Liquid Meniscus Boundary 308 with a given applied voltage. In addition, the thinner the insulator coating 305, the more susceptible the insulator coating may be to dielectric breakdown when voltage is applied. Dielectric breakdown is most likely to occur in non-uniform regions (defects) of the dielectric insulator. The use of some saline solutions in conjunction with applied DC voltage may accelerate the occurrence of dielectric breakdown and ultimate lens failure by electrophoretically driving small molecules into the insulator coating.

In some preferred embodiments, it may be desirable to include a saline solution 306 with density that is generally the same density of an oil 307 also contained within the lens 300. For example, a saline solution 306 may preferably include a density that is within 10% of a density of an oil 307 and more preferably the saline solution 306 will include a density within 5% of a density of an oil 307 and most preferably within about 1%.

In alternative embodiments, closely matched density of oil and saline may not be required, especially in cases where the sum of surface and/or interfacial forces acting on the oil and saline largely outweigh the forces that could be imparted by inertia or gravity. In some embodiments, a concentration of salts or other components within the saline solution 306 may be adjusted to adjust the density of the saline solution 306.

According to the present invention, an arcuate liquid meniscus lens 300 may provide a more stable optical quality by limiting movement of the oil 307 in relation to the front curve lens 301 and the back curve lens 302. One method of maintaining stability of movement of the oil 307 in relation to one or both of the arcuate front curve lens 301 and the back curve lens 302 may be by maintaining a relatively similar density in the oil 307 and the saline solution 306. In addition, due to the arcuate design of the interior surfaces of both the front curve lens 301 and the back curve lens 302, the relative depth or thickness of a layer of saline solution 306 may be diminished as compared to a traditional cylindrical lens design. In this scenario, the interfacial forces acting on fluids within the cavity may have a relatively greater contribution toward maintaining an unperturbed Liquid Meniscus Boundary, Density matching of the oil and saline may become more relaxed in such cases.

In some preferred embodiments, the saline solution 306 provides a lower refractive index as compared to the oil 307. However, in other embodiments it may be possible to include a saline solution 306 with a higher refractive index as compared to the oil 307 which in such cases may provide a relatively lower refractive index.

An adhesive 314 may be used to secure the front curve lens 301 and back curve lens 302 in place proximate to each other thereby retaining the oil 307 and saline solution 306 therebetween. The adhesive 314 may act as a seal so that there is no fluidic leakage of saline solution 306 or oil 307 from the curved liquid meniscus lens 300.

Figure 4:
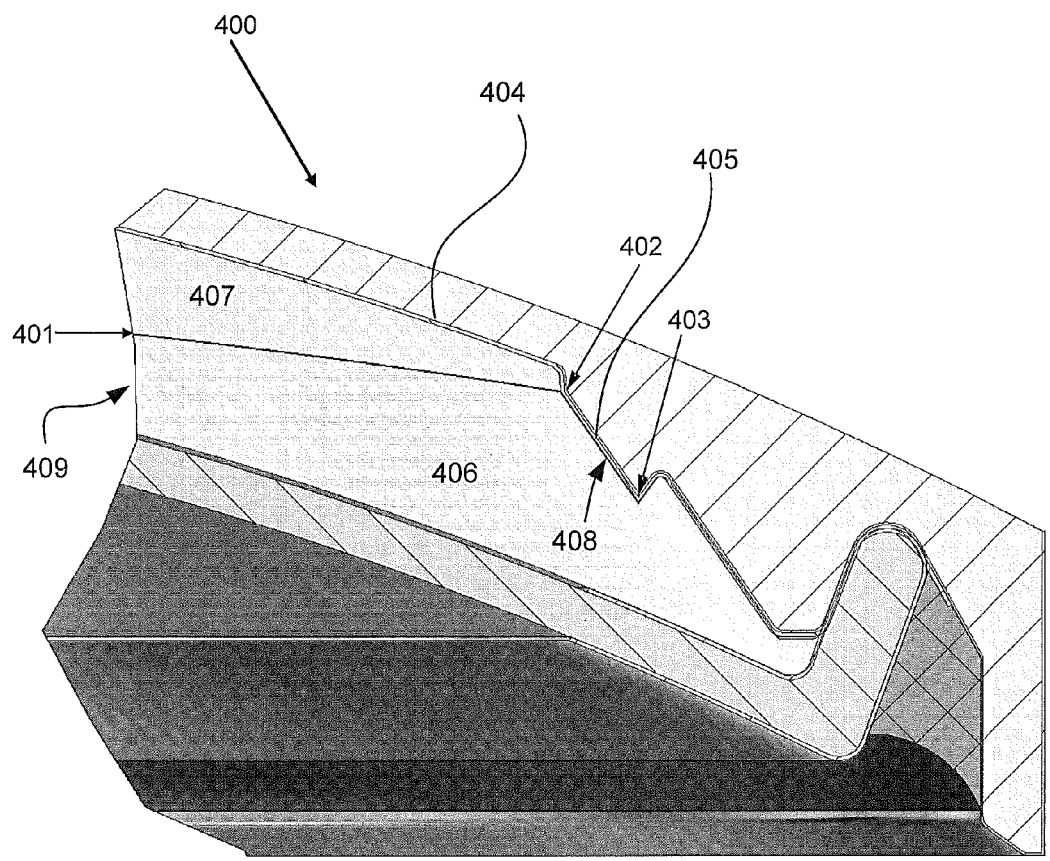
FIG. 4 illustrates additional exemplary aspects of an arcuate liquid meniscus lens.

Referring now to FIG. 4, a curved liquid meniscus lens 400 with a Liquid Meniscus Boundary 401 between the saline solution 406 and oil 407 is depicted. According to some preferred embodiments, a Meniscus Wall 405 may be defined in the front curve lens 404 by a first angular break in an arcuate wall extending between 402 and 403. The Liquid Meniscus Boundary 401 may move up and down the Meniscus Wall 405 as charge may be applied and removed along one or more conductive coatings or conductive materials 408.

In some preferred embodiments, a conductive coating 408 may extend from an area internal to the cavity 409 holding the saline solution 406 and the oil 407 to an area external to the cavity 409 containing the saline solution 406 and oil 407. In such embodiments, the conductive coating 408 may be a conduit of an electrical charge applied to the conductive coating 408 at a point external to the cavity 409 to an area of the conductive coating within the cavity and in contact with the saline solution 406.

Figure 5:
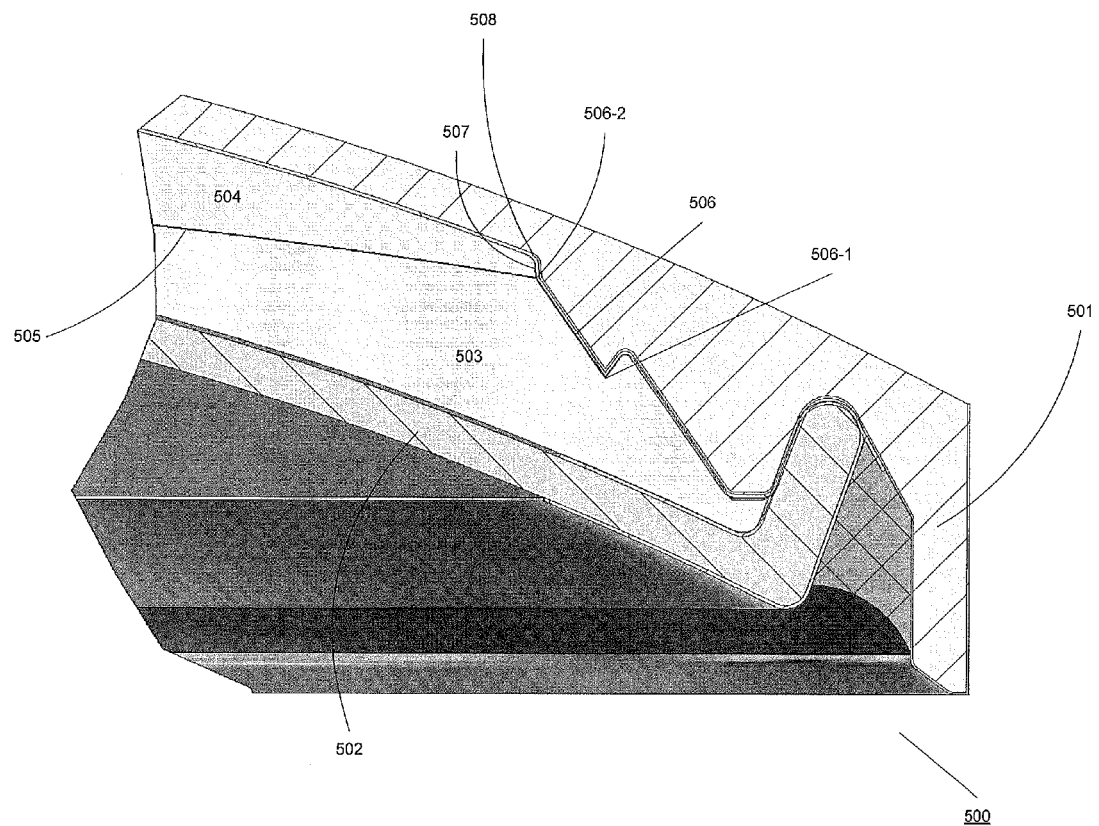
FIG. 5 illustrates Meniscus Wall elements within an arcuate liquid meniscus lens, according to some embodiments of the present invention.

Referring now to FIG. 5, a cut section of an edge of an arcuate liquid meniscus lens 500 is shown with a front curve lens 501 and a back curve lens 502. The arcuate liquid meniscus lens 500 may be used to contain saline solution 503 and oil 504. Geometry of the arcuate liquid meniscus lens 500 and the characteristics of the saline solution 503 and oil 504 may facilitate formation of a Liquid Meniscus Boundary 505 formed between the saline solution 503 and oil 504.

Generally, a liquid meniscus lens may be viewed as a capacitor with one or more of: conductive coatings, insulator coatings, pathways, and materials present on or through the front curve lens 501 and back curve lens 502. According to the present invention, a shape of a Liquid Meniscus Boundary 505 and therefore a contact angle between the Liquid Meniscus Boundary 505 and the front curve lens 501 may change in response to an electrostatic charge applied to a surface of at least a portion of one or both of the front curve lens 501 and the back curve lens 502.

According to the present invention, a change in an electrical potential applied to the saline solution 503 via the conductive coatings or materials results in a change of position of a Liquid Meniscus Boundary 505 along a Meniscus Wall 506. More specifically, movement of the Liquid Meniscus Boundary take place between a first Sharp 506-1 and a second Sharp 506-2.

In preferred embodiments, Liquid Meniscus Boundary 505 may be at or near the first Sharp 506-1 when a first magnitude of electrical potential may be applied to the lens, such as, for example, when the voltage is zero, correlating with an unpowered or rest state.

Application of a second magnitude of electrical potential, sometimes referred to as a powered state, may correlate with a movement of the Liquid Meniscus Boundary 505 along the Meniscus Wall 506 generally in the direction of the second Sharp 506-2, causing the shape of the Liquid Meniscus Boundary 505 to change.

In some embodiments, Meniscus Wall 506 may be a smooth surface in relation to the thickness of the insulator coating. A smooth Meniscus Wall 506 surface may minimize defects in the insulator coating. Additionally, because random irregularities in surface texture may result in uneven fluid motion and therefore may cause uneven or unpredictable meniscus motion when energizing or de-energizing the lens, a significantly smooth Meniscus Wall 506 may be preferred in some embodiments. For example, a significantly smooth Meniscus Wall may include a peak to valley measurement along the Meniscus Wall 506 in the range of between about 1.25 nanometers to 5.00 nanometers.

In yet another aspect, in some embodiments, it may be desirable for the Meniscus Wall 506 to be hydrophobic, in which case a defined texture, such as a nano-textured surface, may be incorporated in the design of the arcuate liquid meniscus lens.

In still another aspect, in some embodiments, the Meniscus Wall 506 may be angled relative to an optical axis of the lens. The optical axis of the lens will generally pass through the front curve lens and the back curve lens. The optical axis will also preferably pass through the liquid meniscus. The angle may range from 0°, or parallel to the optical axis, to at or near 90°, or perpendicular to the optical axis. As illustrated, and in some preferred embodiments, the Meniscus Wall 506 angle is generally between about 30° and 50° in order for the arcuate liquid meniscus lens to function given the current contact angle between the Liquid Meniscus Boundary 505 and the insulator-coated Meniscus Wall 506. With the use of different materials or with different optical objectives, such as telescopic vision, the angle of the Meniscus Wall 506 may be closer to 0° or 90°.

According to the present invention, an angle of a Meniscus Wall 506 may be designed to accommodate a magnitude of movement along a Meniscus Wall 506 upon application of a specified electrical voltage. In some embodiments, as said Meniscus Wall 506 angle increases, the ability to change lens power generally decreases within given lens size and voltage parameters. Additionally, if the Meniscus Wall 506 is at or near 0° relative to the optical axis, the Liquid Meniscus Boundary 505 may be steered nearly straight onto the front optic. Meniscus Wall angle may be one of several parameters that may be customized to provide various pre-determined outcomes for lens performance.

In some preferred embodiments, the Meniscus Wall 506 may be approximately 0.265 mm in length. However, the angle of the Meniscus Wall 506 together with the size of the overall lens may naturally affect Meniscus Wall 506 length in various designs.

It may generally be considered that an arcuate liquid meniscus lens 500 may fail if the oil 504 contacts the back curve lens 502. Therefore, in preferred embodiments, the Meniscus Wall 506 is designed to allow a minimum clearance of 50 microns between the first Sharp 506-1 and the back curve lens 502 at its nearest point. In other embodiments, the minimum clearance may be less than 50 microns, although the risk of lens failure may increase as the clearance is reduced. In yet other embodiments, the clearance may be increased to mitigate the risk of lens failure, but the overall lens thickness will also increase which may be undesirable.

In still another aspect of some preferred embodiments of the present invention, the behavior of a Liquid Meniscus Boundary 505 as it travels along a Meniscus Wall 506 may be extrapolated using Young's Equation. Although Young's Equation defines the balance of forces caused by a wet drop on a dry surface and assumes a perfectly flat surface, the fundamental properties may be applied to the electrowetted lens environment created within the arcuate liquid meniscus lens 500.

When a first magnitude of electric potential is applied to the lens, such as, for example, when the lens is in an unpowered state, there may be a balance of interfacial energies between the oil 504 and saline solution 503 achieved, herein referred to as the Liquid Meniscus Boundary 505, the oil 504 and Meniscus Wall 506, and the saline solution 503 and Meniscus Wall 506, which may result in an equilibrium contact angle between the Liquid Meniscus Boundary 505 and the Meniscus Wall 506. When a change in magnitude of voltage is applied to the arcuate liquid meniscus lens 500, the balance of interfacial energies may change, resulting in a corresponding change in contact angle between the Liquid Meniscus Boundary 505 and the Meniscus Wall 506 as well as a change in curvature of the Liquid Meniscus Boundary.

The contact angle of the Liquid Meniscus Boundary 505 with the insulator-coated Meniscus Wall 506 may be an important element in the design and function of the arcuate liquid meniscus lens 500 not only due to its role in the Young's Equation in movement of the Liquid Meniscus Boundary 505, but also because the contact angle may be used in conjunction with other design features of the arcuate liquid meniscus lens 500 to limit meniscus movement.

Discontinuities, such as Sharps 506-1 and 506-2, at both ends of the Meniscus Wall 506 may act as boundaries for liquid meniscus 505 movement because in some embodiments it would require a significant change in voltage to effect a large enough change in liquid meniscus contact angle to move the Liquid Meniscus Boundary 505 past one of the Sharps. By way of non-limiting example, in some embodiments, a contact angle of the Liquid Meniscus Boundary 505 with the Meniscus Wall 506 may be in the range of 15 to 40° whereas the contact angle of the Liquid Meniscus Boundary 505 with the step 507 below the second Sharp 506-2 is perhaps in the range of 90 to 130° and in some preferred embodiments about 110°.

When voltage is applied to the lens, resulting in movement of the Liquid Meniscus Boundary 505 along the Meniscus Wall 506 toward the second Sharp 506-2, the natural contact angle of the Liquid Meniscus Boundary 505 with the insulator-coated Meniscus Wall 506 may cause the Liquid Meniscus Boundary 505 to stop at the second Sharp 506-2 unless significantly more voltage is supplied.

At one end of the Meniscus Wall 506, a first Sharp 506-1 may define one limit beyond which the Liquid Meniscus Boundary 505 and may thereby prevent any significant movement. In some embodiments, the first Sharp 506-1 may be constructed as a Sharp edge. In other preferred embodiments, the first Sharp 506-1 may have a defined small radial surface which may be created with less possibility of defect. Conductive, insulator, and other possible desired coatings may not deposit evenly and predictably on a Sharp edge, whereas a defined radius edge of the radial surface may be coated more reliably.

In some embodiments, the first Sharp 506-1 may be constructed at about a 90° angle with a defined radius of about 10 microns. The Sharp may also be created with less than a 90° angle. In some embodiments, a Sharp with a larger angle than 90° may be used to increase the sturdiness of the Sharp, but the design would then take up more lens space.

In various embodiments, a defined radius of a Sharp 506-1/506-2 may be in the range of 5 microns to 50 microns. However, in other embodiments a larger defined radius may be used to improve the reliability of the coatings at the cost of using more space within the tight confines of the lens design. In this, as in many other areas of lens design, tradeoffs may exist between ease of construction, optimization of lens functions, and minimizing size. A functional, reliable arcuate liquid meniscus lens 500 may be made using a wide range of variables.

In some embodiments, a larger Sharp radius may be used in conjunction with an improved surface finish on a side-wall between two adjacent Sharps. In some embodiments, it may be desirable that a surface from a first radius (Sharp) to a second radius (Sharp) be smooth and without discontinuities wherein it is helpful to cut a mold used to fashion a Sharp with the same tool. Radii included in a Sharp may be cut into a mold tool surface, wherein the mold tool surface radius may be larger than the Sharp radius. Wherein the mold tool surface is a continuous surface including one or more Sharps and a side wall. A larger tool radius may relate to a smoother surface finish of a corresponding cut.

At 506-2, a second Sharp may include a feature designed to limit oil movement when voltage is applied to the arcuate liquid meniscus lens 500. The second Sharp 506-2 may also include, in some embodiments a Sharp with a generally pointed end, or in other embodiments, the second Sharp 506-2 may include a defined radius of between 5 and 50 microns, most preferred 10 microns. A 10 micron radius performs well as a Sharp and may be created using single point diamond turning lathe or injection molding processes.

A vertical, or nearly vertical step 507, extending to a start of the optical area 508 of the front curve lens 501 may be included on a side of the second Sharp 506-2 opposing the Meniscus Wall 506. In some embodiments, the step 507 may be 120 microns in height, although it could be in the range of 50 to 200 microns.

In some embodiments, the step 507 may be angled at about 5° from optical axis. In other embodiments, the step 507 angle may be as little as 1° or 2° or may be angled more than 5°. A step 507 that is less angled from optical axis may generally act as a more effective limiter of meniscus movement because it may require a greater change in the contact angle of the Liquid Meniscus Boundary 505 to move off of the Meniscus Wall 506 and onto the step 507. In some of the preferred embodiments, the transition from the step 507 to the start of the optical area 508 is a 25 micron radius as a larger radius would unnecessarily consume more space within the lens design. To the contrary, a smaller radius may be possible and may be implemented if necessary to gain space. The decision to use a defined radius rather than a theoretical Sharp in this area as well as others in the lens may be based, in part, on the potential move to an injection molding process for lens elements. A curve between the step 507 and the start of the optical area 508 may improve plastic flow during the injection molding process and result in a lens with optimal strength and stress-handling characteristics.

Figure 6A:
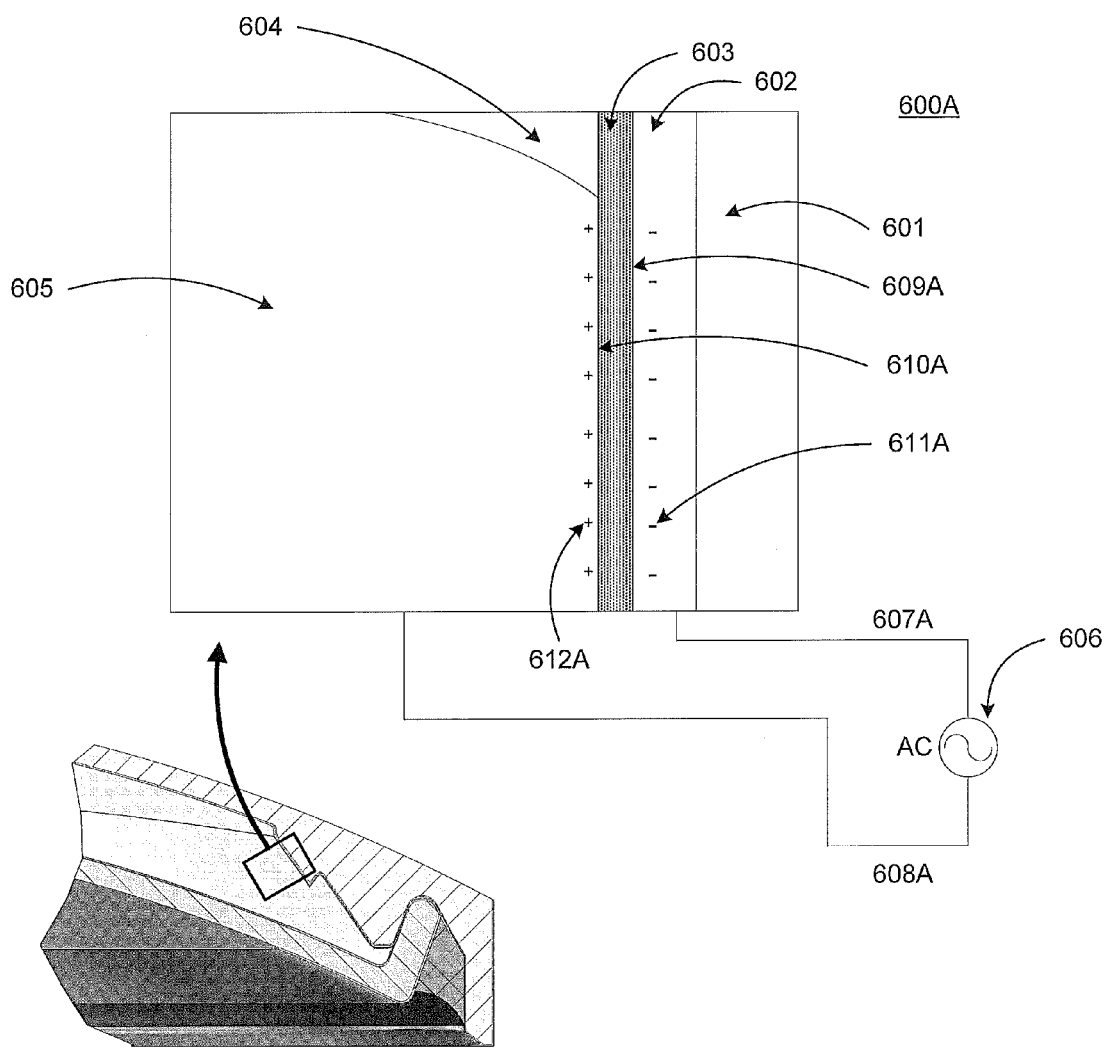
FIG. 6A illustrates a cut section of an arcuate liquid meniscus lens with a standard saline formulation and alternating current in a first state.

Referring now to FIG. 6A, an exemplary cut section of a liquid meniscus lens 600A with a standard saline formulation and alternating current in a first state is depicted. The portion of a liquid meniscus lens includes a Meniscus Wall 601, the interior side of which is coated with an electrically conductive material 602 such as, for example, gold. The conductive coating 602 may be further covered by an insulator coating 603. Within the liquid meniscus lens it may include an oil 604 and a saline solution 605.

Figure 6B:
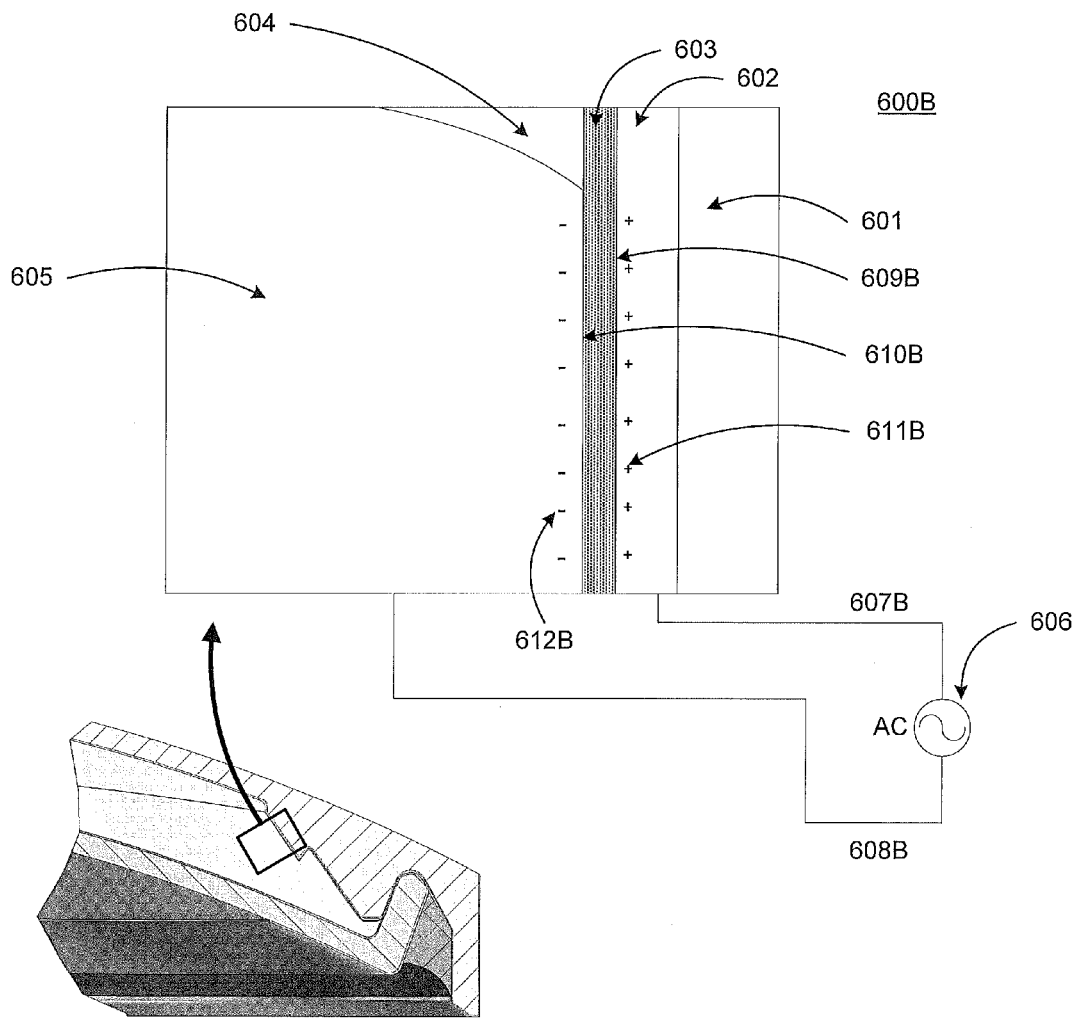
FIG. 6B illustrates the cut section of FIG. 6A in a second state.

In this exemplary embodiment, an alternating current power source 606 is depicted at a moment in time when it is supplying negative bias 607A to the conductive coating 602 and positive bias 608A to the saline solution 605. This may result in the formation of an electric field within the insulator coating 603 as a net negative charge 611A accumulates within the conductive coating 602 at the insulator-conductive coating interface 609A and as a corresponding net positive charge 612A accumulates within the saline solution 605 at the insulator-saline solution interface 610A. In such a state, positive ions associated with the net positive charge 612A within the saline solution 605 may be temporally attracted toward the insulator coating 603. Referring now to FIG. 6B, a cutsection of the liquid meniscus lens in FIG. 6A with a standard saline formulation and alternating current in a second state is depicted. In this embodiment, an alternating current power source 606 is depicted at a moment in time when it is supplying positive bias 607B to the conductive coating 602 and negative bias 608B to the saline solution 605. As a result, the formation of an electric field may occur within the insulator coating 603 with an opposite polarity to the electric field formed in liquid meniscus lens 600A. A net positive charge 611B may accumulate within the conductive coating 602 at the insulator-conductive coating interface 609B and a corresponding net negative charge 612B accumulates within the saline solution 605 at the insulator-saline solution interface 610B. In this state, negative ions associated with the net negative charge 612B within the saline solution 605 may also be temporally attracted toward the insulator coating 603.

When used in conjunction with traditional saline solutions containing dissociated ions of small organic or inorganic salts, for example sodium sulfate, or potassium acetate, the implementation with alternating current, depicted in FIGS. 6A and 6B, may minimize or eliminate charge trapping within the insulator coating of a liquid meniscus lens, although it does so at the cost of higher power consumption. This is partially attributable to the fact that the energy stored in the electric field during each phase of the AC power cycle is typically not fully recovered by existing drive circuitry, and to the extent that it is, efficiencies of such energy recovery methods will be lower than 100% due to circuit resistive elements and dissipation of energy within the insulator coating. This loss of energy may be exacerbated, to a point, by increasing the frequency of the AC drive.

Figure 7:
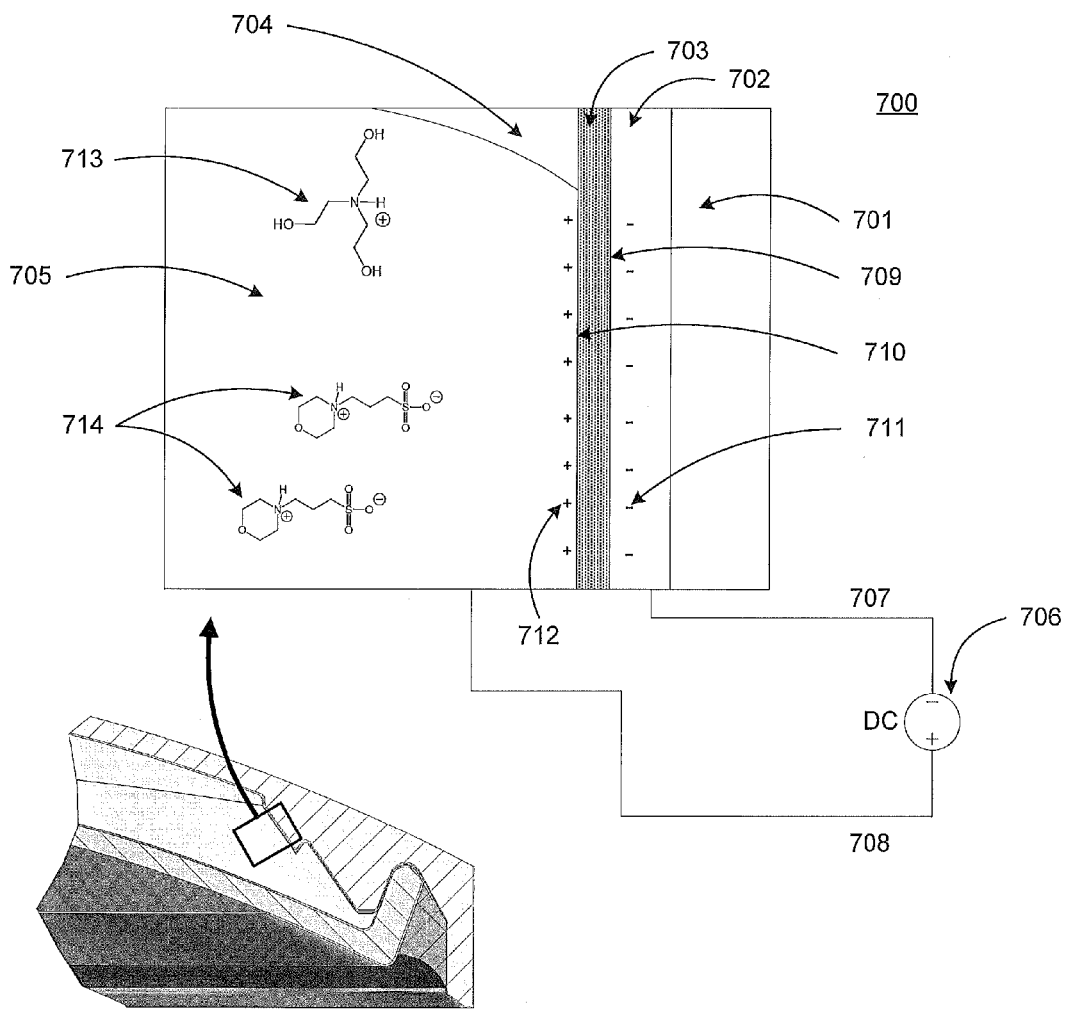
FIG. 7 illustrates a cut section of another exemplary arcuate liquid meniscus lens with a high-efficiency Electrowetting saline formulation powered by direct current.

Referring now to FIG. 7, the current invention is depicted in an exemplary cut section of an arcuate liquid meniscus lens 700 with a high-efficiency Electrowetting saline solution. The portion of a liquid meniscus lens may include a Meniscus Wall 701, the interior side of which is coated with an electrically conductive material 702 such as, for example, gold. The conductive coating 702 may be further covered by an insulator coating 703. Within the liquid meniscus lens an oil 704 and a high-efficiency Electrowetting saline solution 705 may be found as depicted.

Preferred embodiments may include a direct current power source 706. In this depiction, the direct current power source 706 is supplying negative bias 707 to the conductive coating 702 and positive bias 708 to the high-efficiency Electrowetting saline solution 705. This may result in a net negative charge 711 accumulation within the conductive coating 702 at the insulator-conductive coating interface 709 and a corresponding net positive charge 712 accumulation within the high-efficiency Electrowetting saline solution 705 at the insulator-saline solution interface 710. In the exemplary depicted embodiment, a zwitter ion or a zwitterionic species, for example, MOPS (3-(N-morpholino)propanesulfonic acid) 714 may be present within the high-efficiency Electrowetting saline solution 705 and comprises the primary charged species therein, although, the net electrical charge on each MOPS molecule 714 is practically zero when the pH of the high-efficiency Electrowetting saline solution 705 is approximately equal to the $pK_a$ of MOPS, namely at pH=7.2. A solution of MOPS in deionized water will generally be acidic and may require a pH adjustment with a neutralizing agent 713 in order to achieve a pH of 7.2, which may be the isoelectric pH for MOPS. The neutralizing agent 713 as depicted may be triethanolamine ($pK_a$=approximately 7.8), of which, a certain mol fraction may become protonated in the high-efficiency Electrowetting saline solution 705 and may comprise a second charged species with a positive formal charge which may be present in a concentration substantially lower than that of MOPS. In the case of constant DC bias, positive ions in the high-efficiency Electrowetting saline solution 705 would be typically attracted to the insulator-saline solution interface 710 and contribute to charge trapping and performance degradation of an arcuate liquid meniscus lens. However, the net electrical neutrality of MOPS molecules 714 generally may prevent or inhibit them from moving toward the insulator-saline solution interface 710, despite the existence of the protonated morpholino moiety of the MOPS molecule 714 that bears a formal positive charge. Instead, the net positive charge 712 at the insulator-saline solution interface 710 may accumulate due to electrophoretic mobility of the neutralizing agent 713 toward the interface. Structurally, the triethanolamine salt may be too sterically Bulky to significantly permeate into the insulator coating 703, thus charge trapping may be significantly reduced, if not eliminated altogether. It will be evident to those of skill in the art that the foregoing description represents a plurality of facile proton exchange reactions that may be subject to brief kinetic deviations from thermodynamic equilibrium. Consequently, it may be possible for some MOPS molecules 714 near the insulator-saline solution interface 710 to become protonated briefly such that positively charged MOPS molecules 714 may comprise some fraction of the charged species at this interface.

Due to the presence of a relatively high concentration of zwitterionic MOPS molecules 714, the high-efficiency Electrowetting saline solution 705 may have a high ionic conductivity, thereby imparting a fast response of the liquid meniscus lens to applied DC bias. Furthermore, the high-efficiency Electrowetting saline solution 705 may be buffered to a near neutral pH of 7.2 whereby the concentrations of hydronium ions and hydroxyl ions, both small ions of low molecular mass and minimal steric Bulk, may be kept at negligible concentrations of about $10^{-7}$ M. In this manner, the likelihood for hydronium and/or hydroxyl groups to contribute to charge trapping is minimized and since the high-efficiency Electrowetting saline solution 705 may be buffered to near biological pH, it may be especially suitable for use in biomedical applications.

The present invention indicates that saline solutions desirable for use in an Electrowetting device with direct current may include specific characteristics. Saline solutions containing zwitterions at or near their isoelectric point may be advantageous because zwitterions are electrically neutral and are therefore not significantly attracted to the charged insulator interface. The amount of zwitterionic species may be varied over a large range to tailor properties of the saline solution, for example, refractive index, specific gravity, and osmolality, to name a few. Preferred zwitterions useful in this regard may include amino acids, biological buffers such as the so-called Good's buffers, betaines, phospholipids, and other zwitterionic surfactants. Especially preferred zwitterions include those with a $pk_a$ near 7, such as MOPS, PIPES (piperazine-N,N'-bis(2-ethanesulfonic acid)), and TES (2-[[1,3-dihydroxy-2-(hydroxymethyl)propan-2-yl]amino]ethanesulfonic acid).

High-efficiency Electrowetting saline solutions containing relatively large ions may be effective because the large ions, if electrophoretically driven to or in close proximity to an insulator coating, are much less able to penetrate into the insulator coating and cause charge trapping.

In some preferred embodiments, the high-efficiency Electrowetting saline solution may be buffered to near-neutral pH for reduced hazard in a biomedical device. Near-neutral pH may also be advantageous because the concentrations of dissociated water species, namely hydronium ions and hydroxyl ions, may be kept to a very low level of approximately $10^{-7}$ M, thereby minimizing availability of small positive or negatively charged ions that could result in or worsen charge trapping. Additionally, a buffer solution may be useful in that it resists changes to pH, causing the solution to be more stable over time. Accordingly, buffered solutions may require pH adjustment with a neutralizing agent. Preferred neutralizing agents may comprise essentially only Bulky ions when in solution. As described herein, the term bulky shall mean having at least one branched moiety (as in the example of the central nitrogen of triethanolamine) and/or at least one cyclic moiety (e.g. cyclohexylamine).

The high-efficiency Electrowetting saline solution of the present invention may preferably have a specific gravity formulated to substantially match the specific gravity of the oil used in the Electrowetting device so that the liquid meniscus will not be significantly disturbed by gravitational and/or inertial forces, for example, when the device is moved, and so that an aberration-free liquid meniscus may be maintained. However, in other embodiments for applications where a high surface area/volume arcuate design is used, the design may allow substantial density mismatch.

Another aspect of the present invention is to create a saline solution with a dissolved solute content, i.e. osmolality, such that the osmotic pressure gradient between the liquid meniscus lens and its surrounding (e.g. contact lens packing solution or human tears) may be minimized. In some cases, a liquid meniscus lens may be assembled with components comprising water permeable materials. By minimizing the osmotic pressure gradient, the risk of compositional changes within the liquid meniscus lens over time due to diffusion may be reduced and the optical properties may be stabilized during the lifetime of the lens.

A further aspect of the present invention is to provide a saline solution optionally including a surfactant or a mixture of surfactants to favorably adjust the various interfacial tensions within a liquid meniscus lens. A surfactant may be added to reduce the saline solution-oil interfacial tension in order to reduce the drive voltage required to actuate the lens as predicted by the Lippmann-Young equation. Furthermore, surfactants may be used as a processing aid to facilitate saline wetting of the hydrophobic insulator during filling by lowering the saline solution-dielectric interfacial tension and/or the saline solution-air interfacial tension. Inclusion of a surfactant may improve performance of an Electrowetting device. The surfactant may be a zwitterionic or a non-ionic surfactant. Polymeric zwitterionic and/or non-ionic surfactants may also be utilized, for example graft copolymers of poly(ethylene oxide) and poly(dimethylsiloxane) such as DBE-821 sold by Gelest, Inc., or block copolymers of poly(ethylene oxide) and polypropylene oxide) known as poloxamers. By incorporating polymeric surfactants having a number-average molar mass greater than about 1,000 g/mol, the migration of surfactants, water, and salts into the oil phase of the liquid meniscus lens may be reduced. The presence of water and/or charged species within the oil phase may be undesirable as optical quality and liquid meniscus lens performance may both be compromised. Suitable zwitterionic and non-ionic surfactants and polymeric surfactants may be numerous and will suggest themselves to those of skill in the art. The use of anionic or cationic surfactants may be much less preferred; such components may contribute to charge trapping if they are electrophoretically driven to the saline solution-dielectric interface during application of DC bias. Nevertheless, anionic and/or cationic surfactants or polymeric surfactants may also be utilized within the context of the present invention when their contributions to charge trapping may be determined to be negligible. The use of a surfactant is optional as it may be appropriate in some embodiments, and is up to the discretion of the formulator.

Where the saline solution of this invention is used in an ophthalmic device, the saline solution must have suitable optical properties. For example, the refractive index of the saline solution must be substantially different from that of the oil such that a useful refractive interface may be created at the boundary of the two. For practical purposes, this refractive index difference should be about at least 0.05. The refractive index of the saline solution may be adjusted by a variety of means including adjusting the dissolved solids content or by incorporation of an amount of a co-solvent or a mixture of co-solvents. The co-solvent(s) should not substantially ionize when dissolved in water at near neutral pH, otherwise it could potentially contribute to charge trapping. In a preferred embodiment, the co-solvent(s), if utilized, may be innocuous in the ocular environment, for example, propylene glycol, glycerol, and/or low molecular weight poly(ethylene glycols). A wide variety of suitable other co-solvents will also present themselves to those of skill in the art from this disclosure. Additionally, the saline solution should also have an appropriate Abbe number so as to not introduce substantial chromatic aberration in the liquid lens. Finally, the visible spectrum transmittance of the saline should be appropriate to the end use. In some embodiments, light absorbing compounds such as dyes, tints, and/or UV-blockers may be incorporated into the saline solution. Photochromic dyes are especially preferred in some embodiments.

The high-efficiency Electrowetting saline solution of the present invention should have rheological properties that may facilitate rapid motion of the Liquid Meniscus Boundary during its normal operation. In consideration of the very thin fluid layers in arcuate liquid meniscus lens designs, high-efficiency Electrowetting saline solution should have as low a kinematic viscosity as possible. In practical terms, the viscosity should be as close to 1 cSt as possible. It should be recognized from the aforementioned descriptions that high-efficiency Electrowetting saline formulation may be a multivariate problem, and for some applications, the viscosity of the saline may deviate upwards from the target viscosity of 1 cSt at the expense of optimizing some other desirable property, e.g. osmolality. Kinematic viscosities of up to 10 cSt could be useful in some situations, and would clearly maintain the spirit of the present invention.

The high-efficiency Electrowetting saline solution of the present invention should be substantially free of particulate contaminants in order to afford fabrication of high quality liquid meniscus lenses with long lifetimes and good optical quality. Consequently, in some embodiments/application the high-efficiency Electrowetting saline solution should be filtered after preparation and prior to assembly of a liquid meniscus lens using, for example, a 0.45 micron or finer filter. In some cases, when an aseptic saline solution may be desired, for example for use within a biomedical device, the high-efficiency Electrowetting saline solution may be filtered with a 0.22 micron or finer filter.

While the high-efficiency Electrowetting saline solutions of the present invention may afford significantly improved electrical performance when used in conjunction with DC drive, this does not preclude the use of AC drive. The saline solutions are compatible with both AC and DC drive. Using DC drive, the performance of the high-efficiency saline solutions may vary significantly, depending on the polarity of the applied bias. In some cases, only one polarity is suitable using DC drive.

Various high-efficiency Electrowetting saline solution formulations may be used. The following formulations are exemplary and do not limit the scope of the invention:

Formulation 1:
MOPS: 5.0 g (95% purity)
TEOA: 2.5 g (ACS reagent grade)
DI $H_2O$: 95.0 g
Surfactant: 0.1 g (DBE-821, a polyalkylene oxide modified silicone)

Formulation 2:
MOPS: 0.5 g (95% purity)
TEOA: 0.25 g (ACS reagent grade)
DI $H_2O$: 95.0 g
Surfactant: 0.1 g (DBE-821, a polyalkylene oxide modified silicone)

Formulation 3:
Formulation similar to Formulation 1 or Formulation 2 with different surfactant Formulation 4:
Formulation similar to Formulation 1 or Formulation 2 with different salt, such as betaine Formulation 5:
Formulation similar to Formulation 1 or Formulation 2 with no surfactant While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. An optical lens apparatus with an optical quality based upon a liquid meniscus, the optical lens apparatus comprising:
   a front curve lens with a front curve lens exterior surface and a front curve lens interior surface;
   a back curve lens with a back curve lens interior surface and a back curve lens exterior surface, wherein said back curve lens is positioned proximate to said front curve lens such that said front curve lens interior surface and said back curve lens interior surface form a cavity therebetween with an optical axis through the front curve lens and the back curve lens, wherein at least one of said front curve lens and back curve lens comprises a meniscus wall about an interior circumference, and the cavity contains:
   a volume of saline solution and a volume of oil in contact with the meniscus wall, wherein the saline solution comprises one or more zwitterions and one or more sterically bulky neutralizing agents to minimize charge trapping; and
   a liquid meniscus formed by said volume of saline solution and said volume of oil, wherein the liquid meniscus intersects the optical axis formed through the front curve lens and the back curve lens.

2. The optical lens apparatus of claim 1 wherein the pH of the saline solution is approximately equal to the pKa of the zwitterion.

3. The optical lens apparatus of claim 1 wherein the saline solution further comprises one or more cosolvents.

4. The optical lens apparatus of claim 1 wherein the saline solution further comprises one or more ionic surfactants.

5. The optical lens apparatus of claim 1 wherein the saline solution further comprises one or more non-ionic surfactants.

6. The optical lens apparatus of claim 1 wherein the saline solution further comprises a light-absorbing compound.

7. The optical lens apparatus of claim 1 wherein the saline solution further comprises a kinematic viscosity of less than about 10 cSt.

8. The optical lens apparatus of claim 1 wherein the saline solution is free of particulate contaminants having a median particle diameter of about 0.5 microns or greater.

9. The optical lens apparatus of claim 1 wherein the saline solution comprises a specific gravity that is substantially equivalent to that of the oil component.

10. The optical lens of claim 1 wherein an absolute value of a difference of specific gravities between the saline solution and the oil component is greater than about 0.010.

11. The optical lens apparatus of claim 1 wherein both said front curve lens exterior surface and said front curve lens interior surface shape comprise an arcuate shape.

12. The optical lens apparatus of claim 1 wherein both said back curve lens interior surface and the back curve lens exterior surface shape includes an arcuate shape.

13. The optical lens of claim 1 additionally comprising a conductive coating on at least a portion of said meniscus wall.

14. The optical lens of claim 13 wherein the conductive coating extends from an area interior to the cavity to an area external to the cavity.

15. The optical lens of claim 14 wherein the area of conductive coating external to the cavity forms an electrical terminal capable of providing an electrical charge to the liquid meniscus lens.

16. The optical lens of claim 14 wherein the saline solution and the oil form a meniscus and an application of an electrical charge to the area of conductive coating external to the cavity causes a change in position of contact of the meniscus along the meniscus wall.

17. The optical lens of claim 16 wherein the electrical charge comprises a direct current.

18. The optical lens of claim 16 wherein the electrical charge comprises between about 18.0 volts to 22.0 volts.

19. The optical lens of claim 1 wherein the volume of oil is less than the volume of saline solution contained within the cavity.

20. The optical lens of claim 1 wherein the volume of oil contained within the cavity occupies from 60% to 90% of the cavity.

21. The optical lens of claim 1 wherein the volume of the oil has a density within 12% of the density of the saline solution.

22. The optical lens of claim 1 wherein the front curve lens exterior surface comprises an optical power other than about 0 diopters.

23. The optical lens of claim 1 wherein the front curve lens interior surface comprises an optical power other than about 0 diopters.

24. The optical lens of claim 1 wherein the back curve lens interior surface comprises an optical power other than about 0 diopters.

25. The optical lens of claim 1 additionally comprising a liquid meniscus boundary formed by said volume of saline solution and said volume of oil, wherein the liquid meniscus boundary is adapted for movement along the meniscus wall in response to an electrical charge.

26. The optical lens of claim 1 additionally comprising a conductive coating extending from an area internal to the cavity containing the saline solution and the oil to an area external to the cavity containing the saline solution and the oil.

27. The optical lens of claim 26 wherein the conductive coating comprises a conduit of an electrical charge applied at a point external to the cavity to an area of the conductive coating within the cavity and in contact with the saline solution.

28. The optical lens of claim 27 additionally comprising a power source applying a bias to the conductive coating and an opposite bias to the volume of saline solution.

29. The optical lens of claim 1 wherein the meniscus wall has a first and a second angular break, and the meniscus wall is angled relative to the optical axis.

* * * * *